United States Patent
Suzuki et al.

[11] Patent Number: 5,983,843
[45] Date of Patent: Nov. 16, 1999

[54] INJECTOR COOLING FOR DIRECT INJECTED ENGINE

[75] Inventors: Yuichi Suzuki; Katsumi Ochiai, both of Iwata, Japan

[73] Assignee: Yamaha Hatsudoki Kabushiki Kaisha, Iwata, Japan

[21] Appl. No.: 09/055,103

[22] Filed: Apr. 3, 1998

[30] Foreign Application Priority Data

Apr. 12, 1997 [JP] Japan .................................. 9-110373

[51] Int. Cl.⁶ .................................................. F02F 1/36
[52] U.S. Cl. ................................... 123/41.82 R; 123/302
[58] Field of Search ..................... 123/41.82 R, 193.5, 123/302, 305

[56] References Cited

U.S. PATENT DOCUMENTS 4,958,604  9/1990  Hoshimoto ............................ 123/302

FOREIGN PATENT DOCUMENTS 3327810  2/1984  Germany .
3123538  3/1988  Germany .
19542494  1/1997  Germany .

*Primary Examiner*—Noah P. Kamen
*Attorney, Agent, or Firm*—Knobbe, Martens, OLson & Bear LLP

[57] ABSTRACT

A direct injected, internal combustion engine wherein the fuel injector is mounted under the intake passage arrangement in the cylinder head. A cooling jacket is provided in the cylinder head that substantially encircles the injector. Also the water delivery system insures a full flow of water through the injector cooling jacket.

25 Claims, 4 Drawing Sheets

INJECTOR COOLING FOR DIRECT INJECTED ENGINE

BACKGROUND OF THE INVENTION

This invention relates to a direct cylinder injected internal combustion engine and more particularly to an improved arrangement for cooling the fuel injector of such an engine.

In conjunction with the design of internal combustion engines, there is a continuing quest for improved fuel efficiency and better exhaust emission control. Various systems and techniques have been employed to achieve these purposes. One way in which it has been found that the combustion efficiency and emission control can be improved is by use of fuel injection. Fuel injectors permit cycle to cycle control and are generally more accurate than carburetors.

In addition, it is desirable to achieve some stratification in the fuel air mixture in the combustion chamber in order to permit leaner burning. That is, if the entire cylinder is filed with a stoichiometric mixture, under most running conditions, too much fuel is supplied for the required engine performance. Thus, if it is possible to achieve a stratified patch of stoichiometric mixture that is present at the gap of the spark plug at the time of firing, the entire cylinder need not be filled with a stoichiometric mixture and considerable improvements in fuel efficiency and exhaust emission control can resolve.

However, it generally is a fact that stratification can be achieved in an open chambered engine more easily if the fuel is injected directly into the combustion chamber. This will permit the achievement of stratification when desired and also will permit the filling of the cylinder with adequate fuel to obtain maximum power output. Thus, running throughout the entire speed and load ranges can be significantly improved. However, there is a significant problem in the positioning of the fuel injector in the cylinder head so as to achieve direct injection.

Not the least among these problems is the actual positioning of the injector in cylinder head. If high performance is sought and the engine utilizes multiple valves and overhead camshafts, the space availability for the fuel injector becomes limited. Also, it is desirable to position the spark plug generally at the center of the combustion chamber volume at top dead center so as to insure good flame propagation and complete combustion. This further adds to the difficulty in the positioning of the fuel injector.

Furthermore, there is the added difficulty of providing adequate cooling for the fuel injector. This is particularly true where the injector is side mounted and a centrally positioned spark plug is employed. Such side mounting arrangements preferably position the fuel injector on the intake side of the engine and below the induction passage. In this way, the heat from the exhaust gases are not likely to propagate to the fuel injector and deteriorate its performance.

However, this side placement and below the intake passages means that the fuel injector in conventional engines is not adequately cool. Cooling is still necessary because if the injector becomes heated, its efficiency can deteriorate. The problem is particularly true in connection with solenoid operated fuel injectors because the solenoid for actuating the injector valve consumes a fairly large amount of electrical energy and thus, generates a fairly large amount of heat.

It is, therefore, a principal object of this invention to provide an improved cylinder head and injector cooling arrangement for an internal combustion engine.

It is a further object of this invention to provide an improved fuel injector mounting arrangement for an overhead valve multiple valve engine wherein the injector is adequately cooled and nevertheless has the desired spray path.

It is a further object of this invention to provide an improved cylinder head and cooling jacket arrangement for a direct injected internal combustion engine.

SUMMARY OF THE INVENTION

This invention is adapted to be embodied in a direct injected internal combustion engine having a cylinder block that defines at least one cylinder bore having a cylinder bore axis. A piston reciprocates in the cylinder bore and a cylinder head is affixed to the cylinder block and closes one end of the cylinder bore. Thus, a combustion chamber is formed by the cylinder head, the piston and the cylinder bore. An intake passage arrangement is formed in the cylinder head on one side of a plane containing the cylinder bore axis. A spark plug is mounted in the cylinder head with its spark gap disposed contiguous to the cylinder bore axis. A fuel injector is mounted in a fuel injector opening formed in the cylinder head and which is contiguous to the intake passage arrangement and which is disposed at an angle so that the fuel will spray into the combustion chamber toward the cylinder bore axis. A fuel injector water jacket is formed in the cylinder head in part beneath the fuel injector opening and has a part that extends upwardly on at least one side of the fuel injector opening so at least to partially encircle the fuel injector for cooling of the fuel injector.

DETAILED DESCRIPTION OF THE PREFERRED EMBODIMENT

Figure 1:
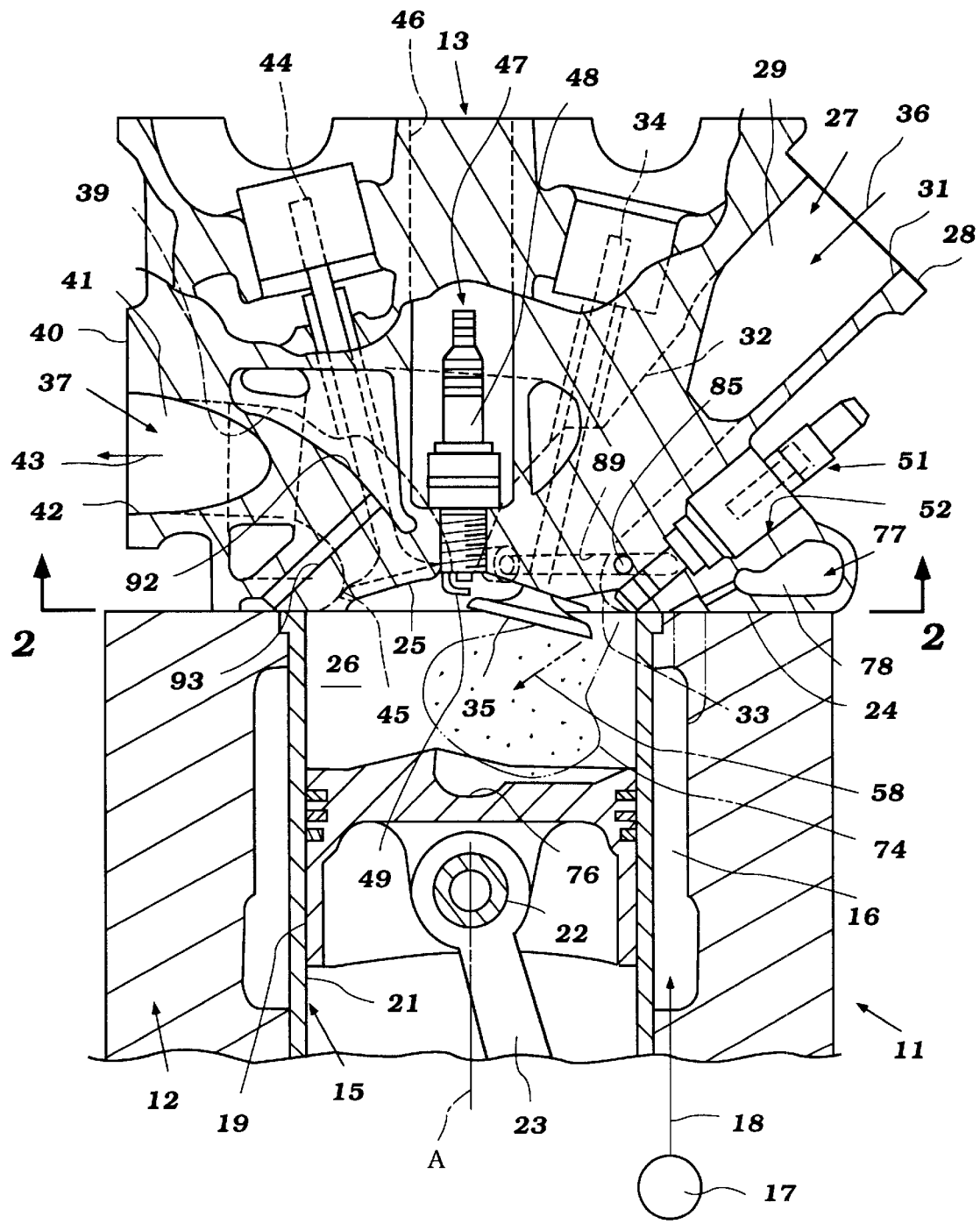
FIG. 1 is a partial cross-sectional view of an internal combustion engine constructed in accordance with an embodiment of the invention and with the water pump for the engine cooling system being shown in part schematically.

Referring now in detail to the drawings and initially primarily to FIG. 1, an internal combustion engine constructed in accordance with the preferred embodiment of the invention is shown partially and in cross-section. The engine is identified generally by the reference numeral 11 and only the upper portion of the engine is depicted. This is because the invention relates primarily to the combustion chamber and components associated therewith and thus, the crankcase and crankcase chamber of the engine are not shown.

The invention is also described in conjunction with a single cylinder engine but it will also be readily apparent to those skilled in the art how the invention can be employed with multiple cylinder engines. Also, the engines may be of any configuration.

For orientation purposes, the engine 11 is depicted as extending vertically. Thus, the terms "top" and "bottom"

will be used with respect to this orientation both in the specification and claims. It will be apparent, however, to those skilled in the art how the invention can be employed with engines wherein the cylinders are disposed other than in a vertical orientation or in fact inverted.

Figure 3:
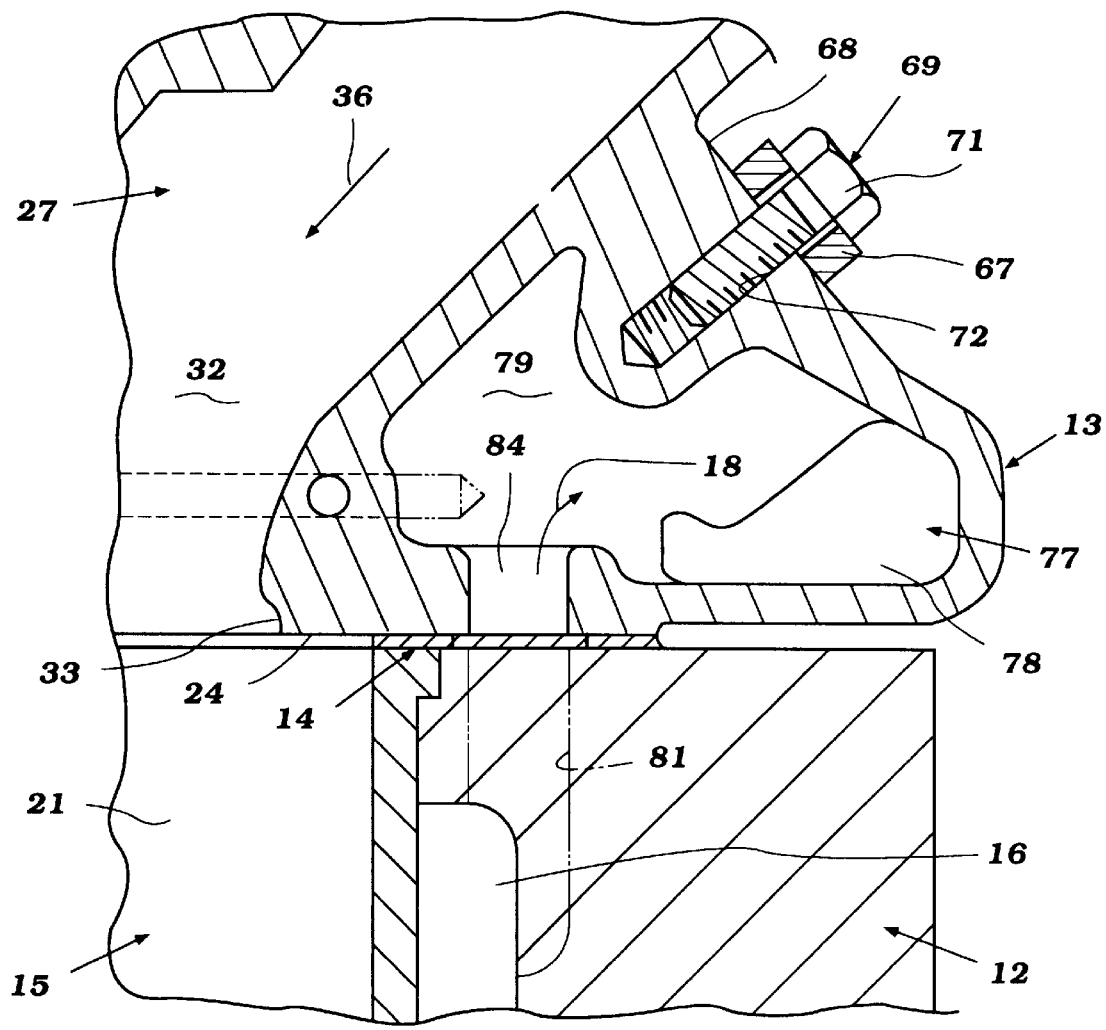
FIG. 3 is an enlarged cross-sectional view taken generally along the line 3—3 of FIG. 2 but showing the engine in its upright position.

The engine 11 includes a cylinder block assembly, that is indicated generally by the reference numeral 12 and to which a cylinder head member, indicated generally by the reference numeral 13 is affixed in a manner which will be described. As seen in FIG. 3, a cylinder head gasket, indicated by the reference numeral 14 is interposed between the cylinder block 12 and the cylinder head 13 for sealing purposes.

The cylinder block 12 may be formed from any suitable lightweight material such as aluminum or aluminum alloy. A cylinder liner 15 is placed within the cylinder block 12. The cylinder block 12 is provided with a recess in areas around the cylinder liner 15, to form a main cylinder block water jacket, indicated generally by the reference numeral 16 through which water is circulated by a cooling pump, shown schematically at 17 with the flow direction being indicated by the arrows 18.

A piston 19 reciprocates within a cylinder bore 21 formed by the liner 15. The axis of the cylinder bore 21 is indicated as A. The piston 19 is connected by means of a piston pin 22 to the upper or small end of a connecting rod which is shown only partially in FIG. 1 and is identified generally by the reference numeral 23. The lower end of the connecting rod 23 is journaled in an appropriate manner on a crankshaft which is not shown.

The construction of the cylinder head 13 will now be described by reference to the remaining figures in addition to FIG. 1. First, it should be noted that the cylinder head 13 has a lower surface 24 that is abuttingly engaged with the upper surface of the gasket 14. This surface 24 is interrupted by a recess 25.

The recess 25 cooperates with the head of the piston 19 and the cylinder bore 21 to form a combustion chamber 26 which varies in volume as the piston 19 reciprocates in the cylinder bore 21. This combustion chamber at top dead center is made up primarily of the combustion chamber recess 25 of the cylinder head 13.

An intake passage arrangement, indicated generally by the reference numeral 27 opens through an outer surface 28 of the cylinder head 13 and serves this combustion chamber 26. The intake passage arrangement 27 is disposed so that it extends generally in a vertically downward direction at a relatively shallow angle to the cylinder bore axis A. The intake passage arrangement 27 includes a common portion 29 that extends in a generally straight line from an opening 31 in the cylinder head face 28. This opening 31 is served by a suitable induction system that includes, among other things, a throttle valve. Atmospheric air is delivered to this induction system in any suitable manner.

The common intake passage portion 29 is divided by a wall and then the branches into a pair of passages 32 each of which continue on along the same generally straight path which curves slightly at its end. Each short curved end portion terminates at a respective intake valve seat 33. These valve seats 33 lie substantially on one side of a plane containing the cylinder bore axis A and which is parallel to and may include the axis about which the engine crankshaft rotates.

Poppet-type intake valves 34 are slidably supported in the cylinder head 13 in a known manner and have head portions 35 that cooperate with the valve seats 33 to control the flow of intake charge into the combustion chamber. The airflow path is indicated in certain of the figures by the reference numeral 36.

The intake valves 34 are urged to their closed positions by suitable spring arrangements and are opened by means of an overhead intake camshaft which is not shown but which is journaled in the cylinder head 13 in a known manner. This intake camshaft is driven at one-half crankshaft speed by a suitable timing drive.

On the side of the cylinder head opposite to the intake passage arrangement 27, there is formed an exhaust passage arrangement, indicated generally by the reference numeral 37. This exhaust passage arrangement 37 includes a pair of exhaust valve seats 38 that serve a pair of passage portions 39 that, in turn, merge into a common outlet portion 41. The outlet portion 41 opens through an outer side surface 40 of the cylinder head assembly through a discharge opening 42. A suitable exhaust manifold (not shown) is affixed to this cylinder head surface 40 for collecting the exhaust gases and discharging them to the atmosphere through a suitable exhaust system. The direction of flow of the exhaust gases is indicated by the arrows 43 in certain of the figures.

Poppet type exhaust valves 44 are slidably supported in the cylinder head 39 and have head portions 45 that cooperate with the intake valve seats 38 to control their opening and closing. The exhaust valve seats 38 lie on the opposite side of the aforenoted plane that contains the cylinder bore axis A from the intake valve seats 33.

The exhaust valves 44 are operated like the intake valves 34 from an overhead mounted exhaust camshaft which is not shown through a suitable actuating mechanism. Return springs which are also not shown hold the valves 44 in their closed positions. The exhaust camshaft like the intake camshaft is driven at one-half crankshaft speed by any suitable timing mechanism.

Centrally of the cylinder head 13 there is formed a spark plug well 46 in which a spark plug 47 is mounted. The spark plug 47 has an insulator portion 48 and a spark gap 49 that protrudes into the cylinder head recess 25. This spark gap 49 is disposed substantially on the axis A of the cylinder bore 21.

A fuel charge is delivered to the combustion chamber 26 by means of a fuel injector, indicated generally by the reference numeral 51 that is supported, in a manner to be described shortly, within a spark plug receiving opening 52 that is formed in the cylinder head 13 below the intake passage arrangement 36. The spark plug receiving opening 52 and fuel injector 51 have an axis B which extends generally parallel to the length of the common portion 29 and the main part of the length of the portions 32.

The fuel injector 51 has a nozzle portion 53 that has a discharge port 54 which is valved by a injector valve which is not shown in a known manner. This injector valve is opened and closed by a solenoid winding that is contained within a main body portion 55 of the injector 51. The injector 55 also has a tip portion 56 with a flow path 57 formed therein to receive fuel that is supplied to it from a fuel supply system through a fuel rail. The direction of fuel flow is indicated by the arrows 58 in FIG. 4.

In order to accommodate the fuel injector 51, the cylinder head fuel injector receiving opening 52 has a first smaller diameter portion 59 that is complimentary to the nozzle portion 53. A seal 61 is received on the nozzle portion 53 for sealing in this area.

The main body portion 55 has a downwardly tapering part that terminates at a shoulder 62 which, in turn, engages a sealing gasket 64 and holds it against a shoulder 65 formed at the end of the nozzle receiving portion 59 of the cylinder head fuel injector receiving opening 51. The main body portion 55 is received in a larger diameter cylindrical portion 66 of the opening 52.

Figure 4:
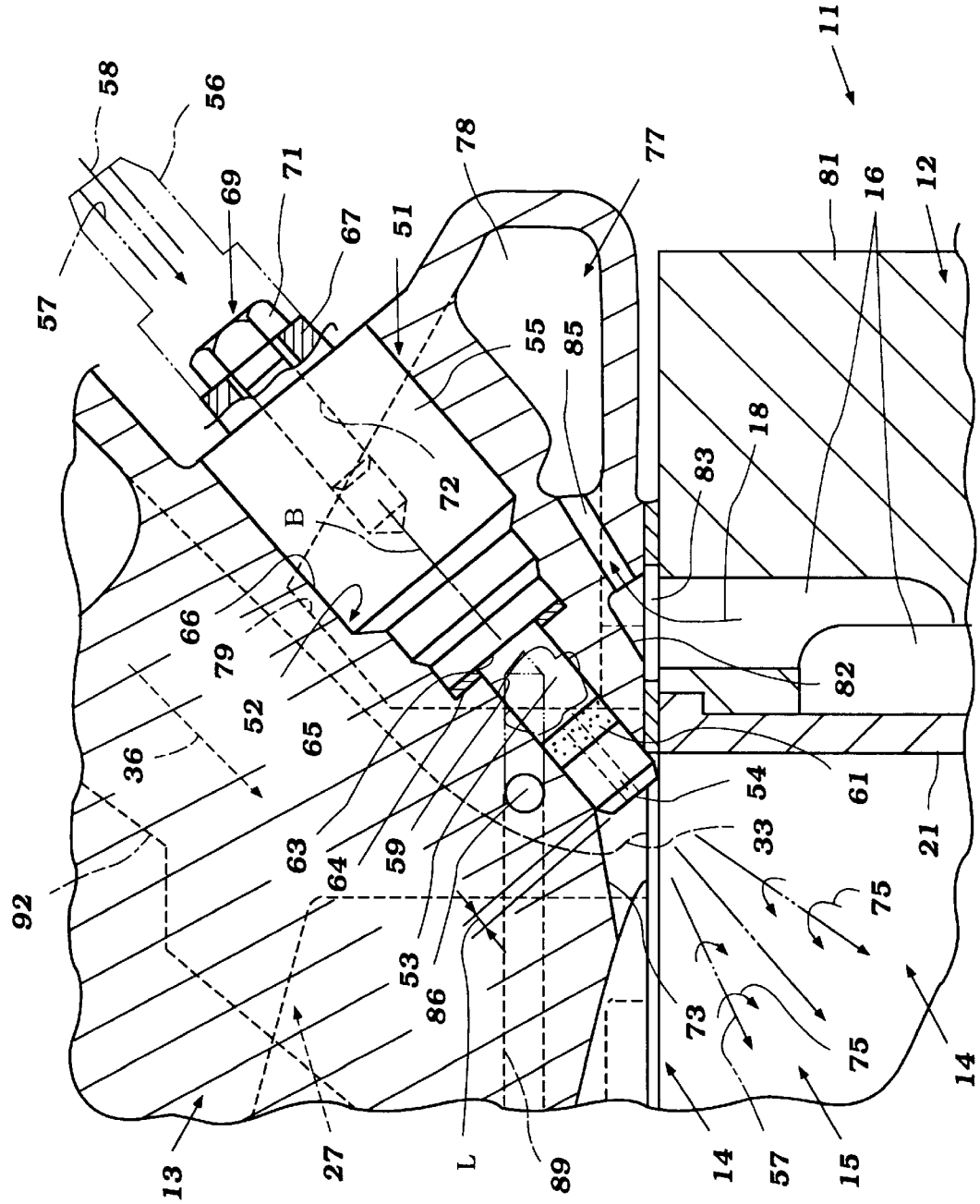
FIG. 4 is a cross-sectional view taken along a plane parallel to the plane of FIG. 3 and passing through the center of the fuel injector receiving recess of the cylinder head.

As best seen in FIGS. 3 and 4, the fuel rail which supplies fuel to the injector portions 56 has an offset flange 67 that is held in engagement with a cylinder head surface 68 by a fastener assembly 69 and specifically the head portion 71 thereof. This fastener is threaded into a tapped opening 72 formed in the cylinder head 13 on one side of the injector receiving opening 52.

Figure 2:
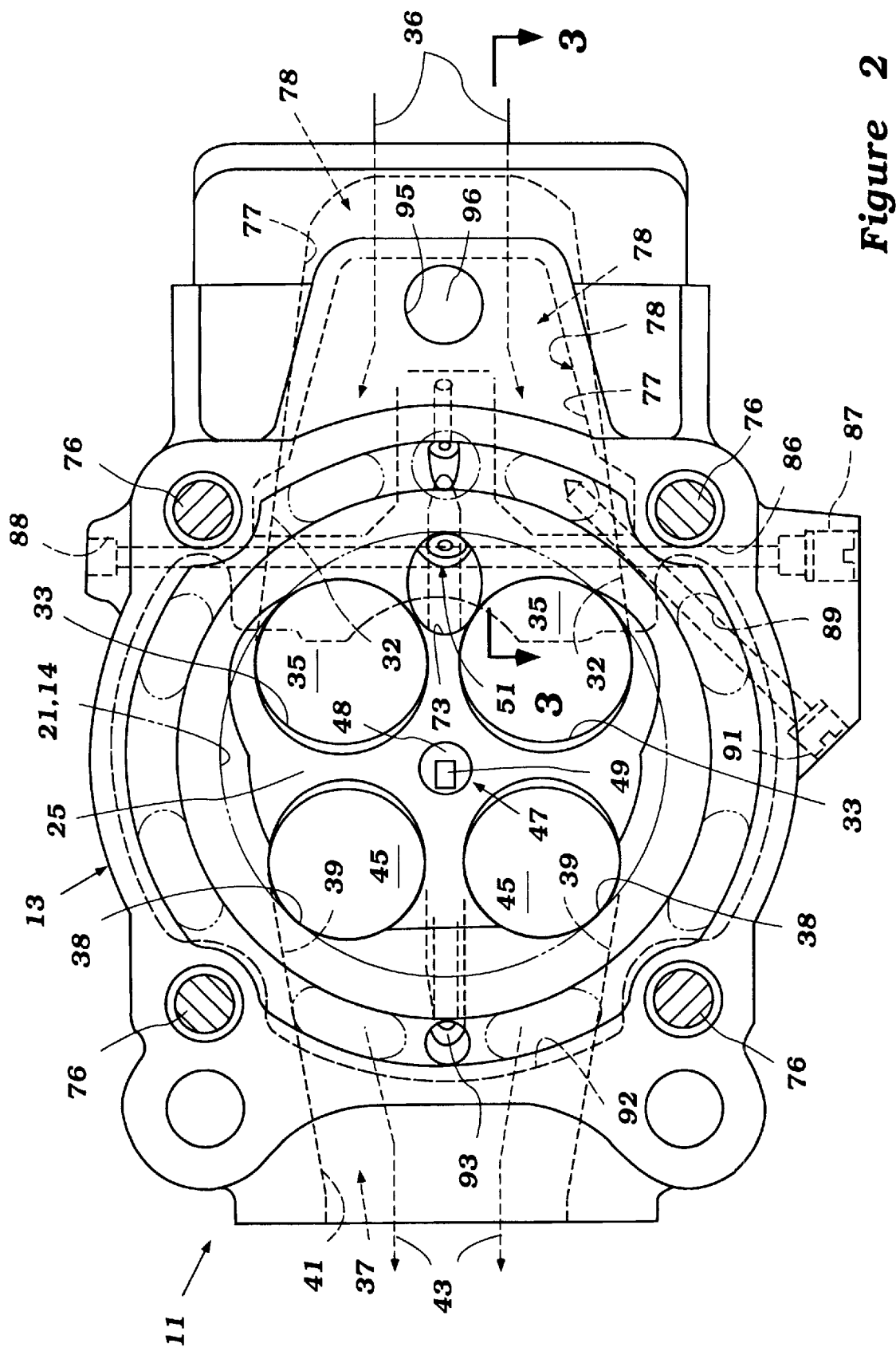
FIG. 2 is a bottom plan view looking at the undersurface of the cylinder head and is taken generally along the line 2—2 of FIG. 1.

It should be noted, and as is best seen in FIG. 4, that the tip of the injector nozzle portion 54 extends a slight distance L beyond the lower part of the cylinder head recess 25. In addition, as seen best in FIGS. 2 and 4, this cylinder head surface 25 is formed with a further recessed part 73 that surrounds the discharge end of the fuel injector nozzle portion 54. This assist in directing the spray and clearing the path of spray from the nozzle portion 54 as shown by the radiating arrows 58 in this figure.

Also, the injector 51 is preferably of the swirl-type so that the fuel spray also has a swirling motion to it as seen by the arrows 75 in this figure. This assist in the fuel dispersion but nevertheless maintains the fuel spray in an area that is relatively confined when small amounts of fuel are sprayed as indicated by the shaded area 74 in FIG. 1. It should also be noted that the head of the piston 19 is formed with a bowl 76 so as to assist in fuel stratification at light loads and low speeds.

Finally, it should be noted from the configuration of the recess that the recessed area 73 terminates so that spray from the injector nozzle will not be directed at the gap 49 of the spark plug 47. This avoids wetting of the plug and possible fouling.

It has been noted that the cylinder head 13 is affixed to the cylinder block 12 in a known manner. The threaded fasteners to achieve this do appear in FIG. 2 and are indicated by the reference numerals 76. It will be seen that these fasteners are spaced generally equal distance from the cylinder bore axis A.

It has been noted that the engine 11 is liquid cooled. The cooling jacket 16 for the cylinder block 12 has already been described as has the supply of water to it by the cooling pump 17. The cylinder head assembly 13 is also formed with a cooling jacket arrangement and this cooling jacket arrangement includes a number of portions that serve to cool various parts of the cylinder head and its auxiliaries.

Primarily, this includes a first cooling jacket portion, indicated generally by the reference numeral 77 and which serves the primary purpose of cooling the fuel injector 51 and specifically the heat generated by the solenoid winding thereof. This cooling jacket portion 77 extends in substantial part below the fuel injector receiving recess 55 and is comprised of a first part 78 thereof. As may be seen in FIG. 3, however, this cooling jacket portion 77 has a pair of further parts 79 that extend upwardly on opposite sides of the cylinder head fuel injector receiving opening 52. In fact, as clearly seen in FIG. 4, the upper terminus of the parts 79 extend vertically above the fuel injector main body portion 55 and also encompasses the sides of the nozzle portion 53. Therefore, the fuel injector will be well cooled and is nearly completely surrounded by this first cylinder head cooling jacket portion 77.

Coolant from the cylinder block cooling jacket 16 is delivered to the cooling jackets of the cylinder head including the cooling jacket portion 77 in an arrangement which will now be described. First, it should be noted that the cylinder block 12 has a number of ports 81 that extend from its cooling jacket 16 to the upper surface of the cylinder block 12 and in an area that is encompassed by the outer peripheral edges of the cylinder head gasket 14. These passages 81 cooperate with a generally circumferentially extending recess 82 formed in the cylinder head surface 24 outwardly of the cylinder bore 21. In the areas where the threaded fasteners 76 lie, the width of the recess 82 is slightly narrowed. The cylinder head gasket 14 has a number of circumferentially spaced openings 83 which are generally aligned with the cylinder block passages 81 and permit the coolant to flow into the recess 82.

At the side portion 79 of the first cylinder head cooling jacket portion 77, there are formed openings 84 that permit coolant to flow into the jacket portion 77 following the water flow path 18. Also, there is a further drilled passage 85 that communicates with the central portion 78 of this cooling jacket portion 77. Thus, coolant well fills this cooling jacket 77 for cooling the underside and sides of the fuel injector 51.

A second jacket for the fuel injector 51 is also provided by a drilled passageway 86 that extends transversely across the cylinder head and which is closed at one end by a screw 87 and at the other end by a plug 88. This passageway is intersected by a further drilled passageway 89 that is drilled into the cylinder head and which intersects both the first cooling jacket 77 and the second cooling jacket 86 so as to transfer water to it. This passageway 89 is closed at its outer end by a closure plug 91.

As may be best seen in FIGS. 1 and 4, the cooling passageway extends across the upper surface of the nozzle portion 53 so as to cool it.

A third cooling jacket portion 92 is formed that extends primarily on the exhaust side of the cylinder head but which also extends in part around the sides of the spark plug 47 and which is intersected by the drilled passageway 86 so as to permit the exchange of coolant to this cooling jacket 92. The cooling jacket 92 is also supplied with coolant directly from the cylinder block cooling jacket 16 through a further coolant passageway 93. This passageway communicates with the groove 82. Cooling water is discharged from the cylinder head cooling jacket through a discharge port (not shown) that communicates with the third cooling jacket portion 92.

The fuel injector cooling jacket portion 77 is formed in pare in a portion of the cylinder head 13 that extends transversely outwardly beyond the surface through which the injector receiving opening 52 extends. This extension will assist in cooling the outer tip of the injector 51 and its fuel rail. A clean out opening 94 (FIG. 2) is formed on the underside of this projecting portion. A freeze plug 96 closes this opening 95.

Thus, from the foregoing description it should be readily apparent that the described arrangement provides a very effective system for accommodating cooling of the fuel injector and other components cylinder head assembly for a direct injected engine and which permits ease of placement of all of the components while insuring good cooling. Of course, the foregoing description is that of a preferred embodiment of the invention and various changes and modifications may be made without departing from the spirit and scope of the invention, as defined by the appended claims.

We claim:

1. A direct injected internal combustion engine having a cylinder block defining a cylinder bore having a cylinder bore axis, a piston reciprocating in said cylinder bore, a cylinder head affixed to said cylinder block and closing said cylinder bore at one end of said piston, said cylinder head, said piston, and said cylinder bore forming a combustion chamber, an intake passage arrangement formed in said cylinder head on one side of a plane containing said cylinder bore axis, a spark plug mounted in said cylinder head with its spark gap disposed contiguous to the cylinder bore axis, a fuel injector mounted in a fuel injector opening in said cylinder head contiguous to said intake passage arrangement and disposed at an angle so as to spray into said combustion chamber, a fuel injector water jacket formed in said cylinder head and having a first part disposed beneath said fuel injector opening and a second part extending upwardly on at least one side of said fuel injector opening so as to at least partially encircle said fuel injector for cooling of said fuel injector, and a pair of spaced apart water delivery passages formed in said cylinder head each of which delivers cooling water at spaced locations to a respective one of said first and second parts of said fuel injector water jacket.

2. A direct injected internal combustion engine as set forth in claim 1, further including a third part of the fuel injector water jacket that extends upwardly on the side of said fuel injector opening opposite the second part so as to at least partially encircle said fuel injector for cooling of said fuel injector, and a third water delivery passages spaced from the pair of water delivery passages formed in said cylinder head for delivering cooling water to said third part of said fuel injector water jacket at a location spaced from said pair of water delivery passages.

3. A direct injected internal combustion engine as set forth in claim 2, wherein the upper extent of the second and third parts of the fuel injector water jacket terminate at points that lie vertically above the adjacent portion of said fuel injector opening.

4. A direct injected internal combustion engine as set forth in claim 1, wherein the fuel injector water jacket extends outwardly relative to the cylinder bore axis beyond the termination of the cylinder head fuel injector opening.

5. A direct injected internal combustion engine having a cylinder block defining a cylinder bore having a cylinder bore axis, a piston reciprocating in said cylinder bore, a cylinder head affixed to said cylinder block and closing said cylinder bore at one end of said piston, said cylinder head, said piston, and said cylinder bore forming a combustion chamber, an intake passage arrangement formed in said cylinder head on one side of a plane containing said cylinder bore axis, a spark plug mounted in said cylinder head with its spark gap disposed contiguous to the cylinder bore axis, a fuel injector mounted in a fuel injector opening in said cylinder head contiguous to said intake passage arrangement and disposed at an angle so as to spray into said combustion chamber, said cylinder head fuel injector opening having a first smaller diameter portion extending from said combustion chamber toward an outer surface of said cylinder head that receives an injector nozzle portion of said fuel injector and a larger diameter portion that extends outwardly to said cylinder head outer surface that receives a main body portion of said fuel injector, a fuel injector water jacket formed in said cylinder head and having a first part disposed beneath said fuel injector opening and a second part extending upwardly on at least one side of said fuel injector opening so as to at least partially encircle said fuel injector for cooling of said fuel injector, and a water delivery passage extending beneath said smaller diameter portion of said fuel injector opening to said fuel injector water jacket for supplying cooling water thereto.

6. A direct injected internal combustion engine as set forth in claim 5, wherein the fuel injector water jacket has a further part that extends transversely across the upper side of the smaller diameter portion of the cylinder head fuel injector opening.

7. A direct injected internal combustion engine having a cylinder block defining a cylinder bore having a cylinder bore axis, a piston reciprocating in said cylinder bore, a cylinder head affixed to said cylinder block and closing said cylinder bore at one end of said piston, said cylinder head, said piston, and said cylinder bore forming a combustion chamber, an intake passage arrangement formed in said cylinder head on one side of a plane containing said cylinder bore axis serving said combustion chamber through at least a pair of intake valve seats formed in the cylinder head with their centers being positioned on the one side of the plane containing the axis of the cylinder bore, a spark plug mounted in said cylinder head with its spark gap disposed contiguous to the cylinder bore axis, a fuel injector mounted in a fuel injector opening in said cylinder head contiguous to said intake passage arrangement and disposed at an angle so as to spray into said combustion chamber, a fuel injector water jacket formed in said cylinder head and having a first part disposed beneath said fuel injector opening and a second part disposed at one side of first part and extending upwardly along at least one side of said fuel injector opening so as to extend beneath and along at least one side of said fuel injector for cooling of said fuel injector and a pair of exhaust valve seats formed in said cylinder head on the other side of said plane containing said cylinder bore axis and an exhaust passage arrangement cooperating with said exhaust valve seats for discharging combustion products from the combustion chamber.

8. A direct injected internal combustion engine as set forth in claim 7, wherein the fuel injector is mounted in the cylinder head between the intake valve seats.

9. A direct injected internal combustion engine as set forth in claim 8, wherein the fuel injector water jacket has a third part that extends upwardly on the other side of the fuel injector opening.

10. A direct injected internal combustion engine as set forth in claim 9, further including three water delivery passages formed in said cylinder head each of which delivers cooling water to a respective of the first, second and third parts of the fuel injector water jacket.

11. A direct injected internal combustion engine as set forth in claim 10, wherein the upper extent of the second and third parts of the fuel injector water jacket terminate at points that lie vertically above the adjacent portion of said fuel injector opening.

12. A direct injected internal combustion engine as set forth in claim 11, wherein the cylinder block has a water jacket and water from said cylinder block water jacket is delivered at least in part to the fuel injector cooling jacket at a point that underlies the fuel injector opening.

13. A direct injected internal combustion engine as set forth in claim 12, wherein a surface of the cylinder head that faces the cylinder block is formed with a circumferential groove around the cylinder bore and to which water is delivered from the cylinder block water jacket.

14. A direct injected internal combustion engine as set forth in claim 13, wherein the water delivery passages all communicate with the circumferential groove.

15. A direct injected internal combustion engine as set forth in claim 11, further including an exhaust water jacket formed in the cylinder head for cooling the exhaust passage arrangement and communicating with the fuel injector water jacket.

16. A direct injected internal combustion engine as set forth in claim 15, further including means for delivering cooling water to the exhaust water jacket independently of the fuel injector water jacket.

17. A direct injected internal combustion engine as set forth in claim 15, wherein the third part of the fuel injector water jacket communicates the fuel injector water jacket with the exhaust water jacket.

18. A direct injected internal combustion engine as set forth in claim 17, wherein the cylinder block has a water jacket and water from said cylinder block water jacket is delivered at least in part to the fuel injector cooling jacket at a point that underlies the fuel injector opening.

19. A direct injected internal combustion engine as set forth in claim 18, wherein a surface of the cylinder head that faces the cylinder block is formed with a circumferential groove around the cylinder bore and to which water is delivered from the cylinder block water jacket.

20. A direct injected internal combustion engine as set forth in claim 19, wherein the water delivery passages all communicate with the circumferential groove.

21. A direct injected internal combustion engine having a cylinder block defining a cylinder bore having a cylinder bore axis, a piston reciprocating in said cylinder bore, a cylinder head affixed to said cylinder block and closing said cylinder bore at one end of said piston, said cylinder head, said piston, and said cylinder bore forming a combustion chamber, an intake passage arrangement formed in said cylinder head on one side of a plane containing said cylinder bore axis and serving said combustion chamber through at least a pair of intake valve seats formed in said cylinder head with their centers being positioned on the one side of said plane containing the axis of the cylinder bore, a pair of exhaust valve seats formed in said cylinder head on the other side of said plane containing said cylinder bore axis and an exhaust passage arrangement cooperating with said exhaust valve seats for discharging combustion products from the combustion chamber, a spark plug mounted in said cylinder head with its spark gap disposed contiguous to said cylinder bore axis, a fuel injector mounted in a fuel injector opening in said cylinder head between said intake valve seats and contiguous to said intake passage arrangement and disposed at an angle so as to spray into said combustion chamber, said intake passage arrangement being Siamesed and said fuel injector lying at least in part beneath a common portion of said intake passage arrangement, and a fuel injector water jacket formed in said cylinder head and having a first part disposed beneath said fuel injector opening and a second part extending upwardly on at least one side of said fuel injector opening so as to at least partially encircle said fuel injector for cooling of said fuel injector.

22. A direct injected internal combustion engine as set forth in claim 21, further including a pair of water delivery passages formed in the cylinder head each of which delivers cooling water to a respective of the first and second parts of the fuel injector water jacket.

23. A direct injected internal combustion engine having a cylinder block defining a cylinder bore having a cylinder bore axis, a piston reciprocating in said cylinder bore, a cylinder head affixed to said cylinder block and closing said cylinder bore at one end of said piston, said cylinder head, said piston, and said cylinder bore forming a combustion chamber, an intake passage arrangement formed in said cylinder head on one side of a plane containing said cylinder bore axis comprising a pair of intake passages extending from a common inlet through one side of the cylinder head and terminating at a pair of intake valve seats, said intake passages having an angularly inclined straight portion extending toward the valves seats and terminating in a curved portion that joins them with the valve seats, a spark plug mounted in said cylinder head with its spark gap disposed contiguous to said cylinder bore axis, a fuel injector mounted in a fuel injector opening in said cylinder head between said intake valve seats and contiguous to said intake passage arrangement and disposed at an angle so as to stray into said combustion chamber, said fuel injector having an axis that is generally parallel to a main flow axis of said intake passage arrangement, and a fuel injector water jacket formed in said cylinder head and having a first part disposed beneath said fuel injector opening and a second part extending upwardly on at least one side of said fuel injector opening so as to at least partially encircle said fuel injector for cooling of said fuel injector.

24. A direct injected internal combustion engine as set forth in claim 23, wherein the fuel injector is disposed in substantial part below the straight portions of the intake passages and extends generally parallel to them.

25. A direct injected internal combustion engine as set forth in claim 23, wherein the fuel injector is disposed between the intake passages.

\* \* \* \* \*